Dec. 31, 1963 S. S. DAVIS ETAL 3,116,244
BELT ALIGNING APPARATUS
Filed May 12, 1960 2 Sheets-Sheet 1

INVENTORS
STEVEN S. DAVIS
ROBERT C. BUNKER
BY Robert A. Finch
Attorney

Dec. 31, 1963  S. S. DAVIS ETAL  3,116,244
BELT ALIGNING APPARATUS
Filed May 12, 1960  2 Sheets-Sheet 2

INVENTORS
STEVEN S. DAVIS
ROBERT C. BUNKER 3,116,244
BELT ALIGNING APPARATUS
Steven S. Davis, Bountiful, and Robert C. Bunker, Salt Lake City, Utah, assignors to The Eimco Corporation, Salt Lake City, Utah, a corporation of Delaware
Filed May 12, 1960, Ser. No. 28,661
1 Claim. (Cl. 210—401)

This invention relates to vacuum filters of the type employing a rotary drum and an endless-belt filter medium trained about the drum and arranged to travel thereon for cake formation then removed for cake discharge and belt cleaning, thence returned to the drum.

In filters of this type it is a requisite that the filter medium be kept centered on the rotating drum lest vacuum be lost and/or slurry enter into the filtrate system.

Another requirement of this type filter is maintenance of the belt in a smooth, wrinkle-free condition.

It is a primary object of the present invention to provide means for use on such endless-belt filters to maintain the belt properly centered on the drum and to compensate automatically for deviations from center.

Another object is the provision of such centering or alignment means which will additionally maintain the belt smoothly stretched across its entire face.

It is known to employ roll means equipped with spiral lands over which the endless belt is trained to maintain it stretched across its width. In such prior installations it has heretofore been necessary to employ separate means for maintaining the belt properly aligned on the drum.

The present invention is predicated on our discovery that spiral rolls (i.e., a roll equipped with spiral lands) or their equivalents, are not limited to the single function of spreading, but may, by certain modifications, arrangement and manipulation be rendered an effective belt aligning mechanism operable in response to deviations of the belt from its true centered position on the drum.

Briefly stated, our invention comprises, in combination with a rotating vacuum drum and a spaced apart discharge roll equipped with spiral lands over which a belt is trained to pass successively, means automatically sensing deviation of the belt from true alignment and for correcting such deviation by increasing or decreasing effective contact of the spiral rolls with the belt surface.

In order that the invention may be more readily understood and carried into effect, reference is made to the accompanying drawings which are offered by way of example only and are not to be taken as limiting the invention, the scope of which is defined by the appended claims rather than by the description preceding them.

Figure 1:
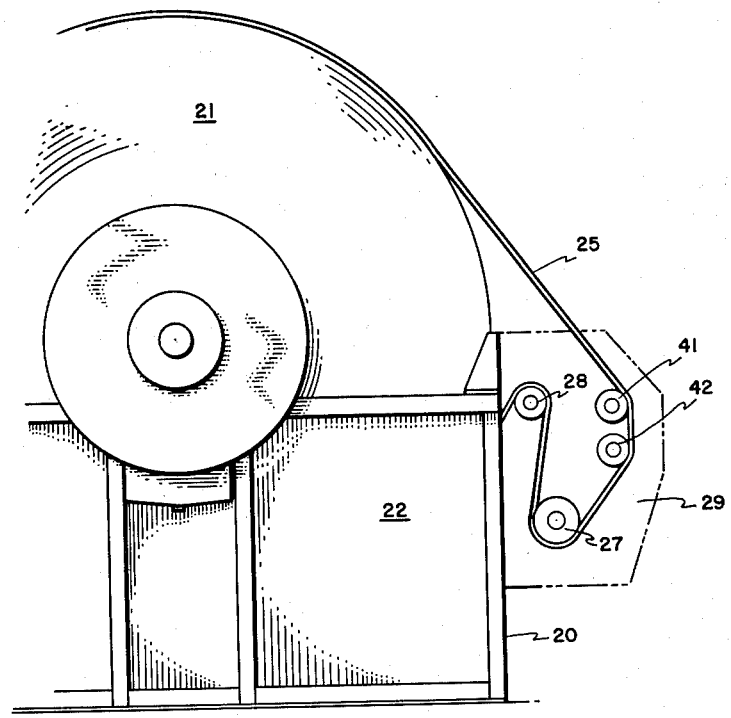
FIG. 1 is a partial end elevational view, partly diagrammatic, illustrating a preferred embodiment of the invention in a drum type filter.
Figure 2:
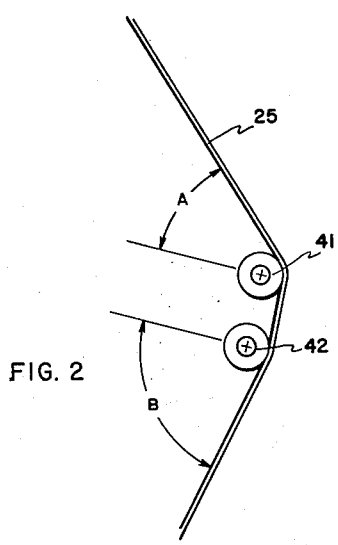
FIGS. 2 and 3 are diagrammatic sketches illustrating operation of the embodiment shown in FIG. 1.
Figures 4, 6, 8:
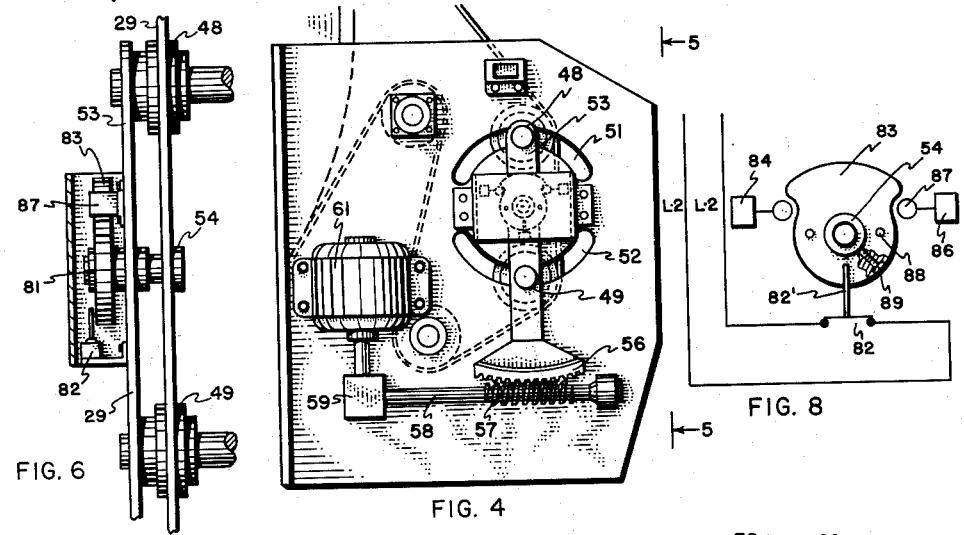
FIG. 4 is an elevational view, partly schematic, illustrating mechanical details of the embodiment shown in FIGS. 1, 2 and 3.
FIG. 6 is an enlarged partial view of the left side of the structure illustrated in FIG. 5, a portion being cut away to show further details.
FIG. 8 is an enlarged view of a portion of the circuitry shown in FIG. 7.
Figure 5:
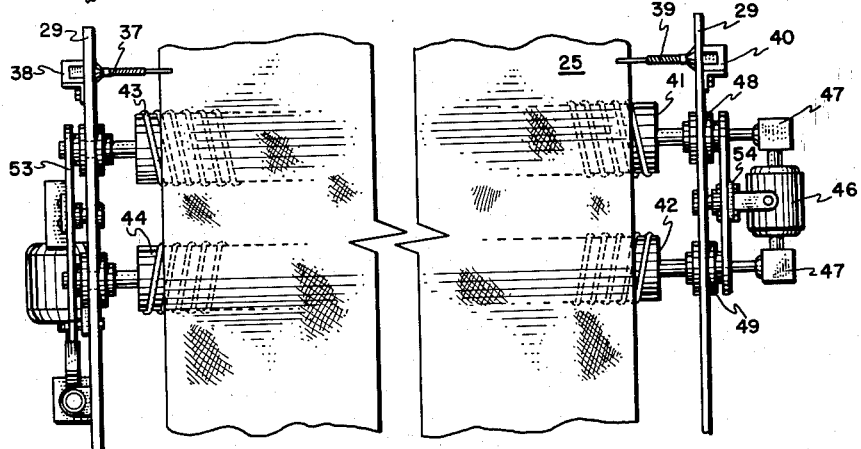
FIG. 5 is a front elevational view, partly schematic, taken in the plane of line 5—5 of FIG. 4.

As best shown in FIGS. 1, 4 and 5, the filter 20 embodying the invention comprises a filter drum 21 rotatably mounted in a tank 22 with the lower portion of the drum submerged in slurry contained in the tank.

Trained about the drum is an endless belt filter medium 25 which passes sequentially over the drum and spaced apart rolls 41, 42, 27 and 28 all of which are rotatably journalled between the end plates 29 extending forwardly of the tank.

During operation, the drum rotates through the slurry in the tank and a cake is formed on the surface of the filter medium. Upon continued rotation, the drum surface emerges from the tank, the endless belt with the deposited cake is removed from the drum, passes sequentially over rolls 41, 42, 27 and 28, thence is returned to the drum surface.

As the belt 25 passes over the rolls, the cake is removed in known fashion while the belt is subjected to necessary wash and the required corrective alignment is effected as hereinafter explained.

In the illustrated embodiment of the invention, rolls 41 and 42 are mounted as a pair to operate as a unit. Each of the paired rolls 41 and 42 is provided with lands, the upper roll 41 being provided with lands 43 spiralling to move the belt in one direction and the lands 44 on the lower roll 42 being of reverse spiral to move the belt in the opposite direction. Both rolls are simultaneously driven at equal speeds by means of a double shaft motor 46 which operates through gear boxes 47 to simultaneously drive the rolls.

As previously noted the rolls 41 and 42 are mounted as a pair so that a change in position of one roll results in a corresponding but opposite position change of the other roll. That is to say effective contact of one roll increases with a simultaneous decrease in effective contact of the other roll.

Rolls 41 and 42 are journalled respectively in bearings 48 and 49. Bearings 48 and 49 are mounted to slide in arcuate slots 51 and 52 and are connected by a link member 53 pivoted at a midway point by a suitable mounting 54. At the lower end of the link is a gear section 56 mounted to engage a worm 57 mounted on a shaft 58 in turn driven from gear box 59 by motor 61. The motor is reversible and is selectively energized by switches 38 and 40 which are provided respectively with feelers 37 and 39 mounted adjacent opposite sides of the filter to sense deviations of the belt 25 from proper alignment.

In normal operation, rolls 41 and 42 are positioned so that they each have substantially equal wrap around of belt 25. This is illustrated in FIG. 1 which shows the angle A, measured between the point of contact of the belt and a line normal to the connecting line between the center of the two rolls to be equal to the angle B defined in the same manner. Under this condition, and with the rolls operating at the same speed, one roll exerts a smooth effect across the entire width of the belt in one direction while the other roll exerts a smoothing effect across the belt in the opposite direction. Thus, the two rolls co-operate to keep the belt smooth. At the same time, because of their equal motion-inducing contact, the belt remains centered.

In connection with the speed of rotation of the aligning rolls, there must be a speed differential between the rolls and the belt surface in order to bring about the necessary spreading action. This may be accomplished by driving the rolls in a direction counter to belt rotation or in the same direction but at a different speed than the belt. This insures effective frictional contact.

In the event the belt deviates from center it will contact a feeler, such as 37, to energize the compensating system as hereinafter described.

Figure 3:
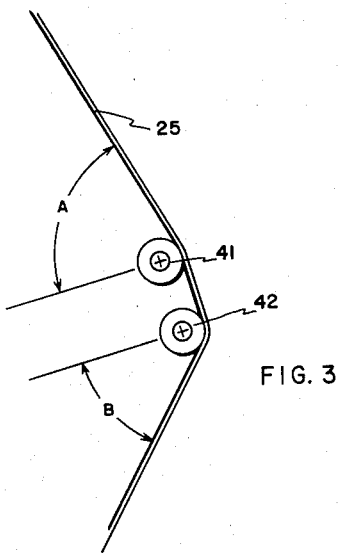

Viewed from the roll driving ends, the rolls are driven counter clock-wise. If the belt moves off center to the left, the lower roll 42 must be made to act more effectively on the belt surface in order to move the belt to the right for re-centering. This is accomplished through a circuitry, hereinafter explained, by which contact of the belt with feeler 37 closes normally open switch 39 energizing the motor in a direction to swing lower roll 42 forward, as shown in FIG. 3, whereby angle "A" becomes greater than angle "B" and the wrap around of the belt on roll 42 increases while decreasing with respect to roll 41. Under such conditions, the effective contact of roll 42 is greater than that of roll 41. The resultant force is to the right thereby returning the belt to the centered position whereupon contact with feeler 37 is lost and the motor reverses to return the rolls to the original or neutral position where it stops.

In the event of rightward displacement of the belt, contact is made with feeler 39 to close switch 40 thus energizing the motor in the opposite direction.

Figure 7:
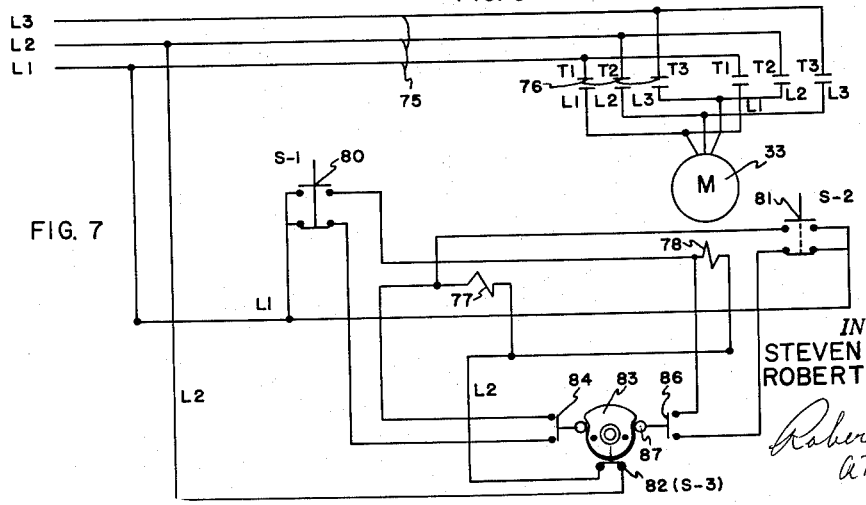
FIG. 7 is a diagram showing circuitry adapted for use in the embodiment illustrated in FIGS. 1–6.

FIG. 7 illustrates a special circuitry adapted particularly for use with the embodiment shown in FIGS. 1–6 and utilizing, in addition to the regular reversing circuitry, means enabling return of the aligning mechanism to a pre-set neutral position and also providing a limit switch to prevent swinging of the unit too far in either direction.

Conventional power lines 75 and contactors 76 connect with the motor 33 and the usual reverse and forward coils 77 and 78 are provided. In place of regular switches, there are provided instead double-throw switches 80 (S–1) and 81 (S–2) and a normally closed limit switch 82 mounted to open upon excessive rotation of a cam 83.

The circuitry includes normally open switches 84 and 86 mounted to be closed alternately and selectively by cam 83 operating through cam followers 87.

Switches 80 and 81 are normally in the position shown, that is, in circuit with coils 77 and 78 but only through normally open switches 84 and 86. Thus in the situation as shown, the motor is de-energized. Upon actuation of either switch 80 or 81 in response to contact of one of the feelers with the belt edge, a sequence of operations is initiated to effect centering of the belt, and to thereafter return the aligning mechanism to a neutral position. Illustratively, if the left feeler 37 is engaged by the belt edge it will throw switch 80 to the reverse position from that shown in the drawing. This will put the motor into circuit through coil 78 and energize it to operate in one direction. This effects rotation of the unit so that cam 83 rotates to the left and comes into immediate contact with cam follower 87 thereby closing switch 84, thus closing the previously described circuit between switch 80 and coil 77. It will be noted however, that so long as the other pole of the double throw switch 80 is in the circuit into which it was initially placed by the feeler 37, switch 84 serves no particular function. After the belt has moved out of contact with feeler 37, switch 80 returns to its original position as shown in FIG. 7 thus completing the circuit between the motor and coil 77 thereby reversing the motor to rotate the cam to the right until the cam follower falls off the high portion of cam 83 thereby breaking the circuit to stop the motor. This returns the entire unit to a neutral position.

In order to prevent excessive motion in either direction there is provided a limit switch 82 schematically illustrated in FIG. 8. This switch is normally closed and is opened by contact with pins 88 on cam 83, thus, if the belt is slow to return to center and the motor operates too long in one direction, the pins will engage element 82' on switch 82 to break the main circuit and thus stop rotation of the unit.

The unit may be conveniently pre-set at a neutral position designed to maintain the belt centered by means of a set screw 89 by which cam 83 is secured to pivot shaft 54. With this arrangement it is simple to pre-set the entire unit at a desired neutral position simply by hand-turning the worm and then adjusting the cam to a neutral position.

From the foregoing description it will be seen that highly efficient ways and means have been provided to effect and maintain true alignment of the endless belt on a traveling belt filter. The illustrated preferred embodiment utilizes the concept of contacting the belt or web with lateral-motion inducing elements and controlling the degree and direction of such lateral motion by regulating the effective contact between the web and motion inducing elements in response to lateral deviation of the web from its preselected path. Stated another way, our invention may be generalized as envisioning the inducing of lateral belt movement and controlling such motion by varying effective contact as above described.

Also to be noted from the preceding description is that an important feature of the invention lies in its ability to effect alignment without stretching of the belt edges as occurs in devices employing angular shifting of roll axes to effect belt movement. In other words, the present invention is effective without changing the relative positions of the axes of the roll and drum.

Having thus described our invention in a manner to facilitate its performance, what we claim and desire to secure by Letters Patent is:

In a filter of the type including a rotatable drum, an elongated assembly in spaced apart substantially parallel relationship therewith and an endless-belt filter medium trained to pass successively about said drum and elongated assembly in surface to surface contact therewith; the improved construction enabling controlled lateral movement of said endless belt substantially parallel to the axis of said elongated assembly at it passes thereover, which comprises said elongated assembly including two rolls rotatably mounted in spaced-apart parallel relationship between common end members and connected thereto, said common end members being mounted to rotate about an axis between and parallel to said rolls, said rolls engaging the same surface of said endless belt at spaced-apart locations on opposite sides of said axis of said common end members, one of said rolls having lands adapted to induce lateral movement of said endless belt in one direction and the other of said rolls having lands to induce lateral movement of said belt in the opposite direction, and means for controllably rotating said common end members about said axis to thereby simultaneously rotate one of said rolls in a direction toward said surface of said endless belt and the other of said rolls in a direction away from said surface whereby to change the effective contact between said rolls and said endless belt by increasing the contact area between said endless belt and said one of said rolls while simultaneously reducing the contact area between the other of said rolls and said belt.

References Cited in the file of this patent

UNITED STATES PATENTS

| | | |
|---|---|---|
| 877,631 | Clark | Jan. 28, 1908 |
| 1,678,925 | Tackaberry | July 31, 1928 |
| 2,812,064 | Siebenthal | Nov. 5, 1957 |